(12) United States Patent
Miele et al.

(10) Patent No.: US 9,945,057 B2
(45) Date of Patent: Apr. 17, 2018

(54) METHOD OF MAKING FIBROUS PRODUCTS AND PRODUCTS

(75) Inventors: Philip Francis Miele, Highlands Ranch, CO (US); Mark Allan Granger, Littleton, CO (US)

(73) Assignee: Johns Manville, Denver, CO (US)

( * ) Notice: Subject to any disclaimer, the term of this patent is extended or adjusted under 35 U.S.C. 154(b) by 888 days.

(21) Appl. No.: 12/706,926

(22) Filed: Feb. 17, 2010

(65) Prior Publication Data

US 2011/0201243 A1    Aug. 18, 2011

(51) Int. Cl.
| | |
|---|---|
| D04H 1/64 | (2012.01) |
| D04H 3/004 | (2012.01) |
| C03C 25/24 | (2006.01) |
| D04H 1/488 | (2012.01) |
| D04H 1/732 | (2012.01) |
| D04H 1/587 | (2012.01) |
| D04H 1/4218 | (2012.01) |
| D04H 3/12 | (2006.01) |

(52) U.S. Cl.
CPC ............. *D04H 1/64* (2013.01); *C03C 25/243* (2013.01); *D04H 1/4218* (2013.01); *D04H 1/488* (2013.01); *D04H 1/587* (2013.01); *D04H 1/732* (2013.01); *D04H 3/004* (2013.01); *D04H 3/12* (2013.01); *Y10T 442/20* (2015.04); *Y10T 442/2254* (2015.04); *Y10T 442/604* (2015.04)

(58) Field of Classification Search
CPC .... C03C 25/243; D04H 1/4218; D04H 1/488; D04H 1/587; D04H 1/64; D04H 1/732; D04H 3/004; D04H 3/12; Y10T 442/2205; Y10T 442/2254

USPC ..... 442/59-180; 428/298.7, 300.1, 359-363, 428/365, 375; 65/25.1, 376, 382, 383, 65/443

See application file for complete search history.

(56) References Cited

U.S. PATENT DOCUMENTS

| | | | | |
|---|---|---|---|---|
| 3,444,116 | A | * | 5/1969 | Rogers et al. ................ 523/412 |
| 5,863,872 | A | * | 1/1999 | Garmier ........................ 508/491 |
| 2002/0051882 | A1 | * | 5/2002 | Lawton et al. ............... 428/378 |
| 2004/0152824 | A1 | * | 8/2004 | Dobrowolski ................ 524/494 |
| 2006/0258248 | A1 | * | 11/2006 | Shooshtari et al. .......... 442/327 |
| 2007/0004811 | A1 | * | 1/2007 | Bruner et al. .................. 521/27 |
| 2011/0091710 | A1 | * | 4/2011 | Mirth .................... C03C 25/243 428/297.4 |

FOREIGN PATENT DOCUMENTS

| WO | WO 2009046521 | * | 4/2009 | ............. C03C 25/24 |
|---|---|---|---|---|
| WO | WO 2009046521 A1 | * | 4/2009 | ........... C03C 25/243 |

OTHER PUBLICATIONS

D. A. Morgan, "Smoke, Fire, and Flash Points of Cottonseed, Peanut and Other Vegetable Oils", U.S. Department of Agriculture, Oil and Soap, Nov. 1942.*

* cited by examiner

*Primary Examiner* — Jennifer A Steele (74) *Attorney, Agent, or Firm* — Robert D. Touslee (57) ABSTRACT

A method of making fibrous mats, webs, and/or blankets containing one or more low volatile de-dusting agents, and the fibrous products so produced, the method eliminating or substantially reducing condensation of volatiles in the drying oven, oven recirculating ducts and oven exhaust ducts and eliminating or substantially reducing oven and duct fires while producing fibrous products having effective dust suppression properties.

15 Claims, 5 Drawing Sheets

METHOD OF MAKING FIBROUS PRODUCTS AND PRODUCTS

This invention involves improved methods of making fibrous products containing one or more de-dusting agents and the products produced by these methods.

BACKGROUND

Fibrous mats, webs and blankets can be made by spinning molten materials like glass, slag, rock and various thermoplastic polymers and copolymers and attenuating the fibers to a desired average or mean diameter with mechanical forces or by jet blasts of air and/or combustion gases. Such processes are disclosed in U.S. Pat. No. 4,058,386 and RE030192, the disclosures of which are incorporated herein by reference, and many patents on processes similar to these patents. It is also known to make glass fiber insulation by forming primary fibers and then attenuating the primary fibers into fine insulation fibers using jet blast attenuation as disclosed in U.S. Pat. No. 5,882,372, the disclosure incorporated herein by reference, and in patents covering similar processes. It is also known to produce mat or webs from above type fibers and/or from fibers made from molten material by passing the molten through orifices, with or without nozzle tips, to form primary fibers and then to attenuate the still soft fibers by mechanically pulling or pulling with one or more rapidly moving gaseous streams to the desired diameters followed by collecting the fibers, wet or dry, onto a moving permeable belt. Also, numerous other systems and methods are known for forming fibrous mats, webs and/or blankets such as those wet or dry systems/methods used to make various kinds of paper, carding and lapping, and inclined wire wet laid nonwoven mat forming.

In the processes of making fiber glass insulation products in web, blanket or batt forms, usually the fibers have average fiber diameters of less than 10 microns, more typically less than about 5-6 microns and most typically in the range of about 3 to about 5 microns. The fibers are bonded together in the final product by intertwining by needling or water jets or with a cured resin binder, the latter being applied as an aqueous binder to the fibers soon after they are formed. The cured resinous binder forms a rigid matrix that is often broken when the mat, web or blanket, bat is cut, compressed for packaging, etc. or torn during manufacturing or application or use. Regardless of the system and method for forming the fibrous mat, web and/or blanket, the products usually contain some portion of very short fibers, fiber chips and other dust as a result, which tends fly off of the mat, web and/or blanket products during packaging, un-packaging, further processing, and/or use.

Normally a de-dusting agent is applied to the fibers and attenuated fibers prior to, during or after an aqueous binder is sprayed or otherwise applied onto the fibers prior to collecting the wetted fibers onto a permeable moving belt to form a thin mat, fibrous web or thick fibrous blanket, to reduce the dusting of the fibrous product. The mat, web and/or blanket is then usually passed through an oven, sometimes while being compressed by platens or moving belts, to control the thickness, to dry the product and to cure any binder on the fibers and in the fibrous product. The use of one or more de-dusting agents, applied in coarse particles or coarse droplets to the fibers before collection into an insulation mass is old, e.g. see U.S. Pat. No. 4,134,242, the disclosure incorporated herein by reference.

The glass fiber industry has used petroleum based oils, applied to the fibers in amounts typically of about 1 wt. percent of the final product to minimize or eliminate shedding of the short fibers, chips and dust from the fibrous products. A widely used petroleum oil for this purpose Brightstock 150 type oil available from Sun Oil Company having the tradename of SunPar™2280, having a typical viscosity of 480 centistokes at 40 degrees C. and a flash point of 304 degrees C. minimum. The de-dusting petroleum oil is applied to the glass fibers soon after they are formed (often included with the aqueous binder) and then the fibers, in mat, web and blanket forms, are exposed to temperatures up to about 316 degrees C. in ovens to dry and cure the binder. During the curing, low molecular weight components of the petroleum oils de-dusting agent(s) are driven off and condense on cooler parts of the oven and exhaust fans and ducts. These volatiles and condensate cause undesirable emissions that usually must be abated, and more importantly, cause fires in the oven or exhaust ducts, the latter being both dangerous and very costly. Also, changes in the petroleum industry are reducing the availability of Brightstock type oils that are suitable as de-dusting agents. Oven and oven duct fires are frequent events in glass fiber insulation process lines. When a fire occurs, the line must be shut down immediately so the fire can be extinguished. This causes loss of production, scrap, and further maintenance downtime after the fire is extinguished. Extinguishing the fires is also dangerous as the oven and exhaust ducts are very hot and people can get burned by the fire, hot metal parts and steam. While the cost of a typical oven or exhaust duct(s) fire is very high, more importantly, it creates a situation where people fighting the fire can be injured. Also, it is possible in most oven fires for the fire to extend beyond the oven or oven ducts to other parts of the manufacturing line and the plant.

Fibrous mats are also produced by a process known as dry laid or wet laid processes in which fibers dispersed in air or water are laid onto a moving permeable belt moving over one or more suction boxes to remove the air or water to form a fibrous web. An aqueous binder and de-dusting agents are then applied to the wet or dry fibrous web in conventional ways and, after removing any excess binder and water, the wet, bindered fibrous web is carried through an oven to dry remove the water and to cure the binder in the mat. Such processes are disclosed in (add wet and dry laid mat process patents).

There is a need for an alternative de-dusting agent, a method of making glass fiber products containing an effective alternative de-dusting agent(s) and the products so produced.

SUMMARY

It has discovered that if vegetable oils, having certain properties, are used as the de-dusting agent(s), the problem of volatilization of low molecular weight components in the petroleum based Brightstock 150 type de-dusting oils is minimized or eliminated and the availability problem is also eliminated. Vegetable oils such as Soybean oils that have been thermally processed to reduce volatilization at the resin curing temperatures described above and to oxidize the Soybean oil to higher molecular weights are suitable for use in the invention. Such oils are more thermally stable, containing about 40-60 percent less, more typically about 45-55 percent less and most typically about 50+/−3 percent less volatiles at 300 degrees C. when tested with thermal gravitational analysis (TGA) than the Brightstock 150 type petroleum oil de-dusting agents (see Table 1 below)

TABLE 1

| Dedusting Agent | Total % Weight Loss at 300° C. for 30 minutes |
| --- | --- |
| Brightstock 150 | 65 |
| Tech Grade Soybean Oil | 55 |
| AgriPure Gold 750 | 34 |

Typically the de-dusting oil used in the invention will have a flash point of at least about 300 degrees C. per (ASTM D-92), more typically at least about 310 degrees C., even more typically at least about 315 degrees C. and most typically about 324+/−2, 4 or 6 degrees C. The dedusting agent should typically have a viscosity of about 100 cSt to about 2000 cSt at 40 degrees C., more typically about 400 to about 1000 cst, even more typically about 600 to about 900 cSt and most typically about 748+/−50 cSt. The de-dusting agent should typically have a viscosity of about 10 cSt to about 400 cSt at 100 degrees C., more typically about 30 to about 200 cst, even more typically about 50 to about 100 cSt and most typically about 69+/−10 cSt. The de-dusting agent should typically have an acid value of about 1 to about 100, more typically about 3 to about 80, even more typically about 5 to about 60 and most typically about 12+/−4 and a hydroxyl value of about 1 to about 100, more typically about 3 to about 80, even more typically about 5 to about 50 and most typically about 15.5+/−5. A thermally processed vegetable oil meeting these requirements is AgriPure Gold™ 750 (CAS-No. 68918-91-2), available from Cargill Company of Minneapolis, Minn. This product has a flash point (Cleveland Open Cup) (ASTM D-92) of approx. 324 degrees C., higher than petroleum oils used as de-dusting agents. It has a viscosity index of 166 and a viscosity at 40 degrees C. of about 748 cSt (centistokes) and about 69 cSt at 100 degrees C. The specific gravity is 0.95, the acid value is about 11.9 and the hydroxyl value is about 15.5. Another advantage of using such processed oils is that they do not have to be emulsified.

The invention includes methods of making of a fibrous mat, web and/or blanket, and the products so produced, the methods comprising;
a) applying about 0.2 to about 1.2 wt. percent, based on the dry weight of the fibrous mat, web and or blanket product, of the oil de-dusting agent meeting the above description to the fibers made by attenuating a molten material,
b) collecting the treated fibers into a fibrous web, mat or blanket,
c) passing the fibrous mat, web or blanket through an oven to remove the water to dry the fibrous mat, web or blanket and to cure any binder therein, at temperatures up to about 300 degrees C.

The fibers used to make insulating fibrous webs, mats or blankets vary in diameter and length depending upon the intended application as is well known in the art of fibrous products. In thermal insulation product webs, mats and blankets, the fiber is usually a staple product having various lengths and average fiber diameters usually below about 6-10 microns, more typically less than about 5 microns and even more typically less than about 3 microns. In mat products, having a thickness of less than about 50 mils, the length of the fibers are more precise varying from about $1/16^{th}$ inch to about 3 inches long or longer. More typically the lengths of the fibers in the mat products are in the range of about 0.1 inch to about 1.5 inch long with 0.2 to 1.25 inch being the most used. The diameter of at least some of the fibers in mat products are substantially larger, sometimes up to 40 microns, more typically up to about 30 microns, even more typically up to about 23 microns and most often up to about 16 microns. Some fibrous mat, web and blanket products contain microfibers, very fine fibers, having average fiber diameters of less than about 2 microns, more typically less than about 1 micron and often less than about 0.6 micron. Such very fine fibers are in most thermal insulation products and are also used in mats, etc. to make filter products and products used for containment facers on laminates like gypsum wall board, foam insulation, and other similar products. The fibers are typically conventional glass fibers of any glass composition, but can also be inorganic and mineral fibers including ceramic fibers of all types, carbon fibers, and basalt fibers, slag fibers or rock wool fibers.

Suitable de-dusting agents used in the invention include processed oils that have low volatiles at temperatures up to about 300 degrees C. and a flash point of at least about 310 degrees C. while also having suitable viscosities for application.

Some advantages of the methods and products of the invention include:
1) Material cost savings because of reduced usage of de-dusting agent(s) per unit of product since none of the de-dusting agent(s) will be volatilized off due to hot fibers in the forming chamber or hot gases in the drying and curing oven.
2) Elimination, or substantial reduction, of the condensation of volatiles driven off of the de-dusting agent(s) in the oven, oven recirculation ducts and exhaust ducts. This is a very important safety improvement and also a substantial cost savings.
3) Condensation of de-dusting agent(s) on the cooling table (??) is eliminated.
4) Reduced oven exhaust emissions.
5) Eliminates the need for emulsifying oil when used in aqueous binders.
6) The final fibrous product, such as fiber glass insulation, has a tactile feel, i.e. there is a perception of a film on the fibers that makes the product user friendly, less abrasive to the skin and less irritating after substantially handling. The fibrous product feels similar to lambs wool containing lanolin.

When the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF SOME EMBODIMENTS AND THE BEST MODE

Figure 1:
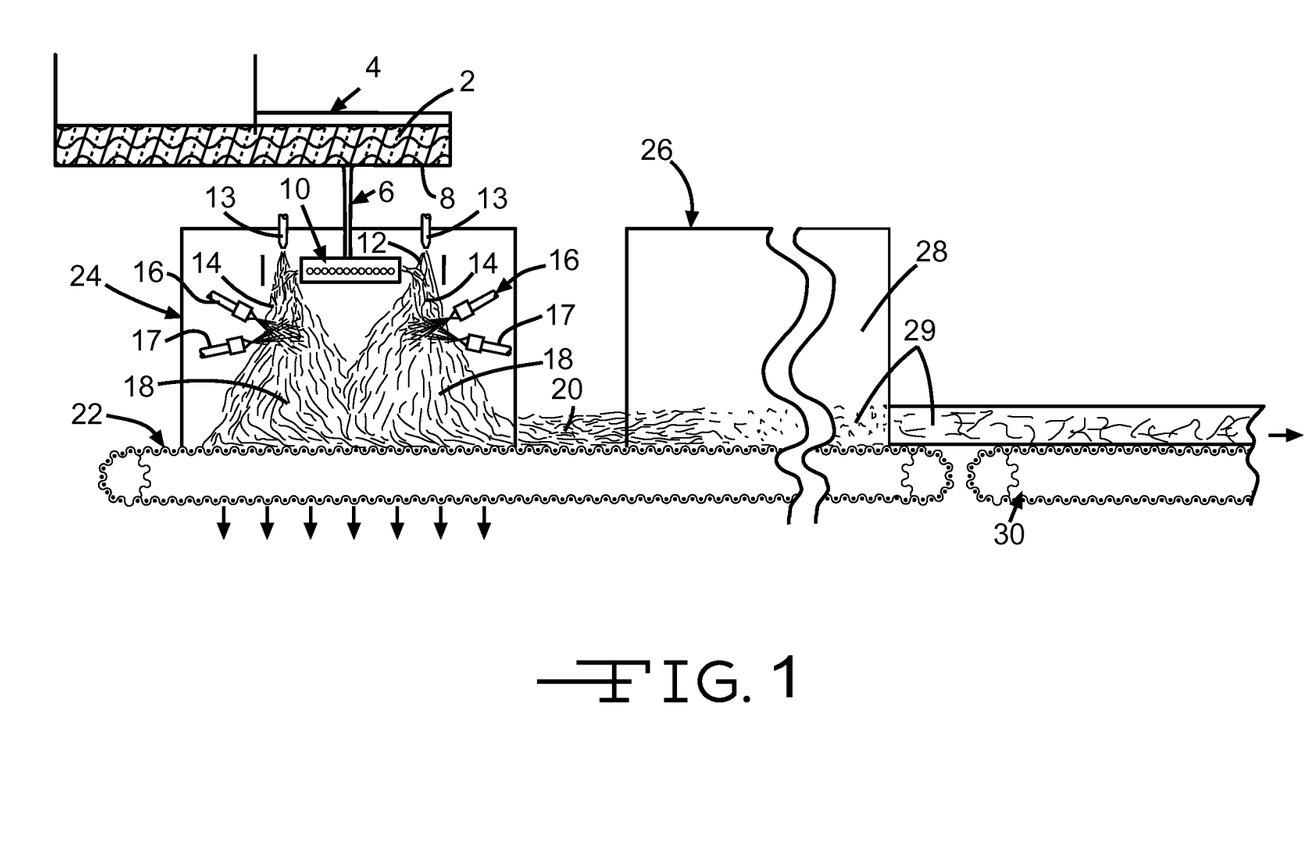
FIG. 1 shows a typical system for making a fibrous insulation product according to the invention.

FIG. 1 shows a typical system of the invention used to make fibrous insulation, such as fibrous glass insulation, according to the method of the invention. A molten material 2, such as glass, slag, polymer(s), rock, and/or ceramic, is melted in any suitable furnace 4 for melting such materials. One or more streams 6 flows from one or more conventional orifice(s) (not shown) in the bottom 8 of the melting furnace 4 and each molten stream 6 falls into a rapidly rotating refractory metal spinner 10 having a plurality of spaced apart holes in a vertical wall of the spinner 10. Small diameter molten streams 12 emerge continuously from the spaced apart holes in the vertical wall of the spinner 10 and form primary fibers that are immediately turned downward and attenuated into very small diameter fibers 14 by high velocity jets of air, steam, or combustion gases coming from a plurality of nozzles 13, or a continuous slot of a manifold, located above the spinner 10 and outside the vertical wall.

The very small diameter fibers, e.g. having a mean diameter of less than about 6 microns, typically less than about 4 microns and more typically less than about 2-3 microns, are then further cooled with by spraying with a water mist, and/or optionally, but typically, are coated with a liquid binder using one or more spray nozzles 16. The de-dusting agent is either included in the liquid binder or is sprayed onto the very small diameter fibers 14 separately through spray nozzles 17 either in the same vicinity where the liquid binder is applied or after the liquid binder is applied.

The very small diameter fibers 18 are collected to form a mat, web or blanket 20 on a moving permeable belt or chain 22, usually with the aid of a conventional suction fan (not shown) pulling air from a forming chamber 24, containing the very small diameter fibers 14 and fiber treating equipment. The nonwoven fibrous web or blanket 20 is carried out of the forming chamber 24 and into a drying oven 26. The oven 26, in a downstream end 28, after the water or other cooling liquid has been removed, can reach a sufficient temperature, usually in the range of about 175 to about 305 or 345 degrees C., to also cure any binder that is present in the dried fibrous web or blanket 29. The maximum oven temperature should be safely below the flash point of the de-dusting agent in the mat, web or blanket. The dried fibrous web or blanket 29 is then carried on the same permeable belt 22, or more typically, transferred onto a second permeable belt 30 or carried on a roller conveyor for conventional trimming and/or packaging.

Figure 2:
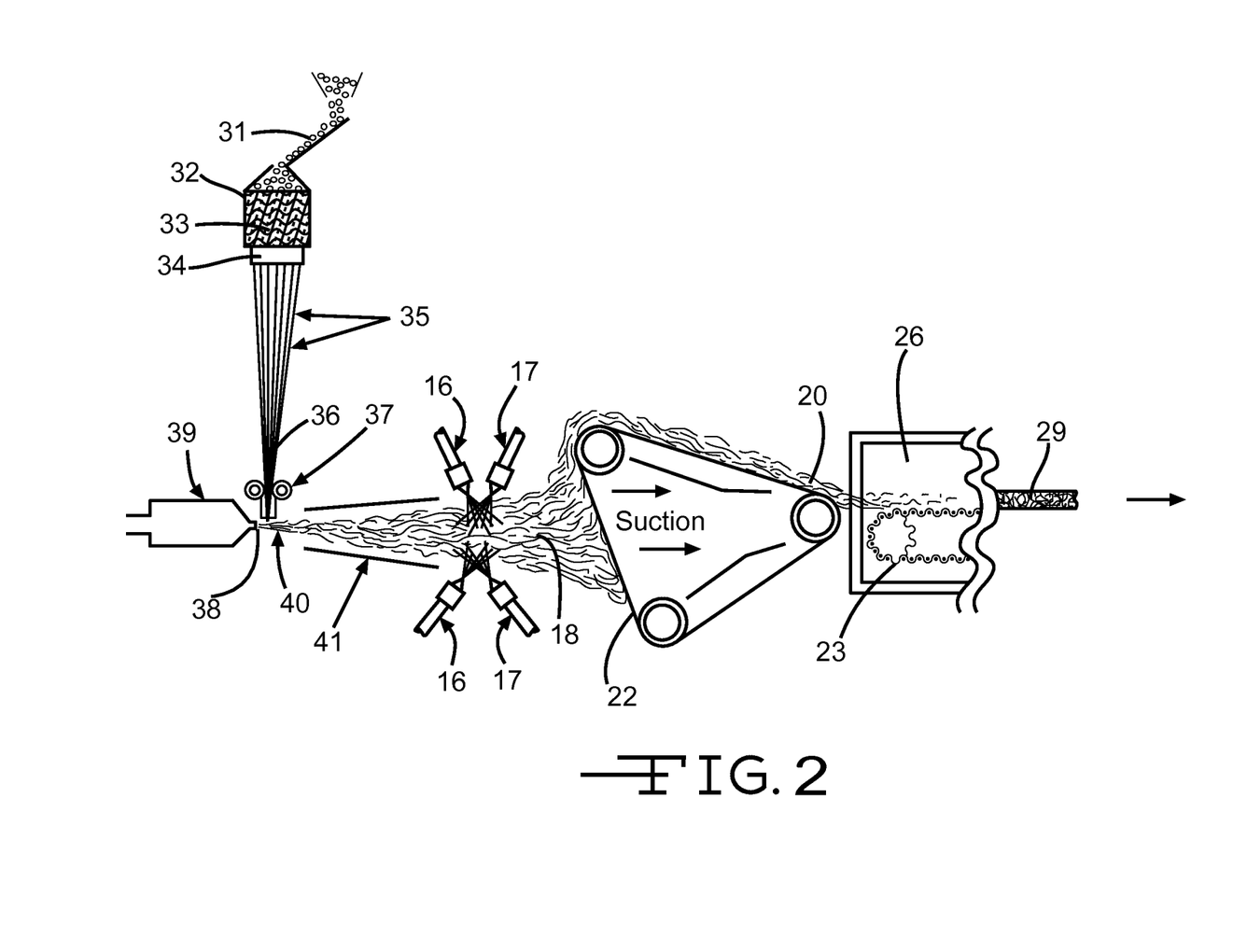
FIG. 2 shows another typical system for making a fibrous insulation product according to the invention.

How the fibers are made is not critical to the system and method of the invention. For example, FIG. 2 shows another conventional system of making insulation fibers for making insulation webs and blankets. In this system, glass marbles 31 are fed to a melter 32 where the marbles 31 are melted to form a melt 33 that is brought to a fiberizing temperature in a bushing 34 having a plurality of orifices in a bottom plate. The molten glass flows through the plurality of orifices to form an array of primary fibers 35 and cooled to form solidified primary fibers 36. The solidified primary fibers 36 are pulled by a set of pull rolls 37 and fed into a hot jet blast 38 exiting a pressurized jet burner 39. The hot jet blast 38 re-melts the solidified primary fibers 36 and attenuates them into insulation fibers 40 having average mean diameter within a forming tube 41. The insulation fibers 40, while they are suspended in an air flow from the jet burner 39 and inspirated outside air are sprayed, with nozzles 16, with water or an aqueous binder and the de-dusting agent(s) according to the invention, or alternatively, the de-dusting agent(s) can be applied with separate spray nozzles 17 following or during the application of the liquid binder, preferably before the fibers are collected on a permeable belt in the form of a web, mat or blanket.

The resulting cooled fibers 18 are then collected into a web or blanket 20 on a moving, permeable belt 22 and carried onto another permeable belt, chain belt or a platen belt 23 and carried through an oven 26 where water is removed and any binder in the web or blanket 20 is cured to form a fibrous web or blanket 29 that is then ready for conventional trimming and/or packaging.

Figure 3:
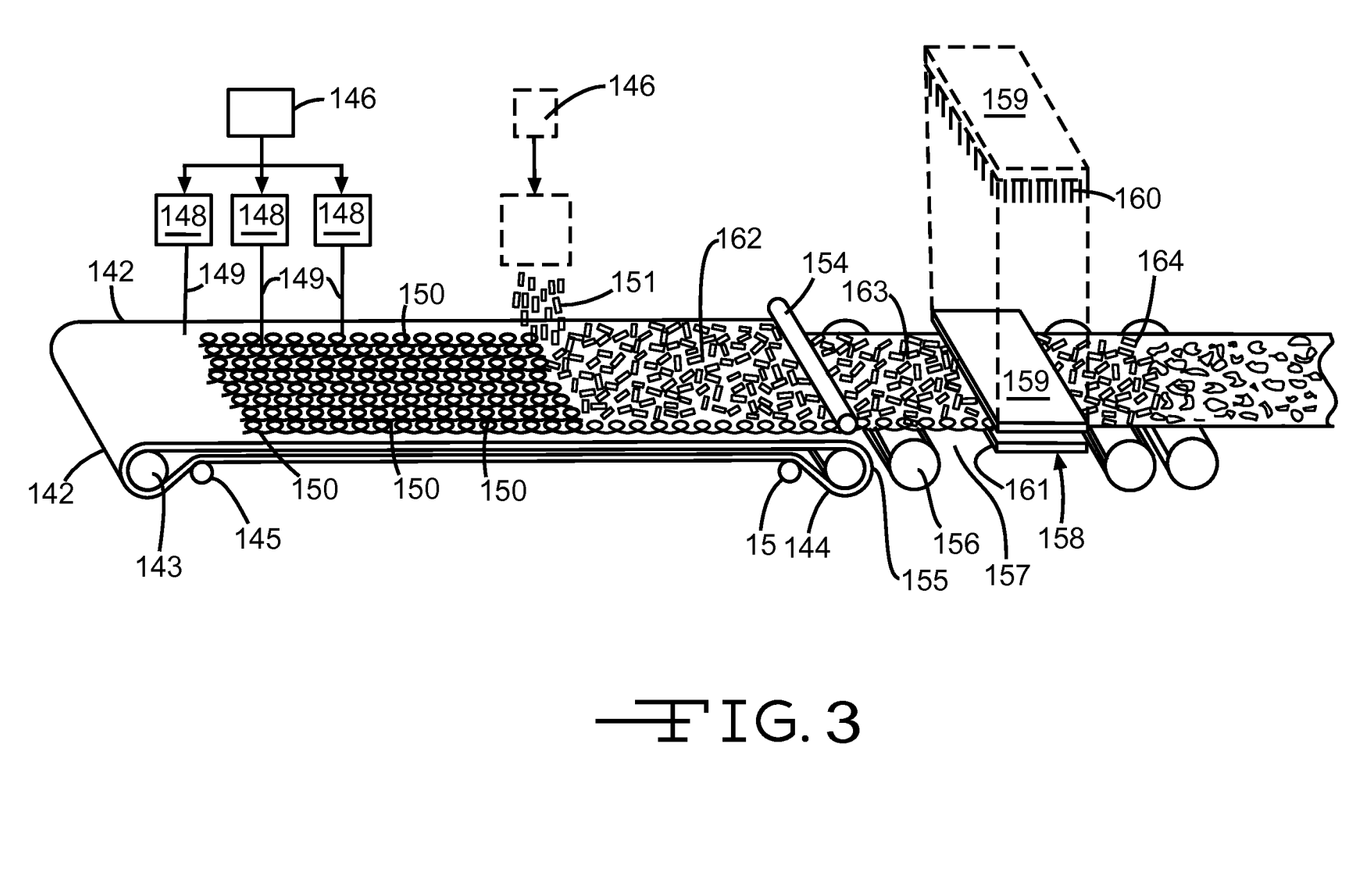
FIG. 3 shows a typical system for making a dry laid nonwoven mat according to the invention.

Fibrous mats, webs and thinner blankets are often made in several different processes, all using needling to intertwine the fibers together to provide bonding in the product without using binder, or with the use of a much smaller amount of binder. The needling breaks some of the fibers and creates short fibers and chips and/or particles, i.e. dust. FIG. 3 is a perspective view of such a system for laying down a fibrous mat or web or thinner blanket from dry staple fibers or chopped fibers or fiber strands and optionally continuous fiber strands. In this system the mat, web or thinner blanket is built up on a moving conveyor belt 142 having a freely rotating head shaft 143, a driven tail shaft 144 and one or more take-up shafts 145. Continuous fiber rovings 149 can optionally be laid down first onto the moving belt 142 using a plurality of conventional roving applicators 148 supplied with one or more roving packages 146. The rovings can be of any type including various types of direct wound rovings having a single fiber strand and/or manufactured rovings having multiple fiber strands. The applicators can lay the rovings 149 down onto the moving conveyor belt 142 in any desired pattern including parallel strands or in loops as shown. The thickness of the rovings layer can be controlled by varying the speed of the conveyor belt 142, by adding one or more rows of applicators 148 or by any combination of these.

Next, chopped fibers or chopped strands, each chopped strand containing a plurality of fibers, are randomly dropped onto the moving rovings 150. Again, one or more roving packages 146 feed one or a plurality of roving strands 152 into a conventional fiber strand chopper 153 that separates the roving strands into pieces of desired length, usually a length in the range of about 12 to about 75 mm long. The thickness of the chopped fiber or chopped fiber strand layer can be varied by varying the speed of the conveyor belt 142, by adding multiple choppers or any combination of these. When formation of the web, mat or thinner blanket is complete, one or more consolidating rollers 154 compresses the web, mat or blanket 162 sufficiently that the consolidated web will stay together across a gap 155 between the tail end of the conveyor belt 142 and a supporting roller 156.

Another optional consolidating roller (not shown) like the roller 154 can be mounted above the supporting roller 156 to further strengthen the consolidated web 163, etc. to span another gap 157 between the supporting roller 156 and a conventional needling machine 158. The needling machine 158 comprises an upper needle board 159 comprising a plurality of conventional barbed needles 160 and a lower needle board 161, also containing a plurality of barbed needles 160. In a conventional manner, the upper needle board 159 and the lower needle board 161 oscillate up and down to cause the needles 160 to penetrate the consolidated web 163 to push fibers down through the web on the penetrating strokes and then on the withdrawal strokes the barbs on the needles 160 pull different fibers in an opposite direction in the web to cause densification of the web and intertwining and locking of the fibers as is well known. When the needle boards and needles are withdrawn from the web, the consolidated mat is pulled, with a down stream puller (not shown) an incremental distance for the next needling stroke. In this manner a needled web, mat or thinner blanket 164 is produced.

The fibrous mats 164 are made of one or more of a wide variety of fibers including natural fibers, synthetic polymer fibers, ceramic fibers glass fibers, carbon fibers and any combination thereof. The diameter of the fibers are not critical, but usually have mean or average fiber diameters of less than about 30 microns, normally less than about 23 microns, typically less than about 17 microns including less than 6 microns, and for thermal insulation and filtration mats, less than about 3 microns including submicron average or mean diameters.

Figure 4:
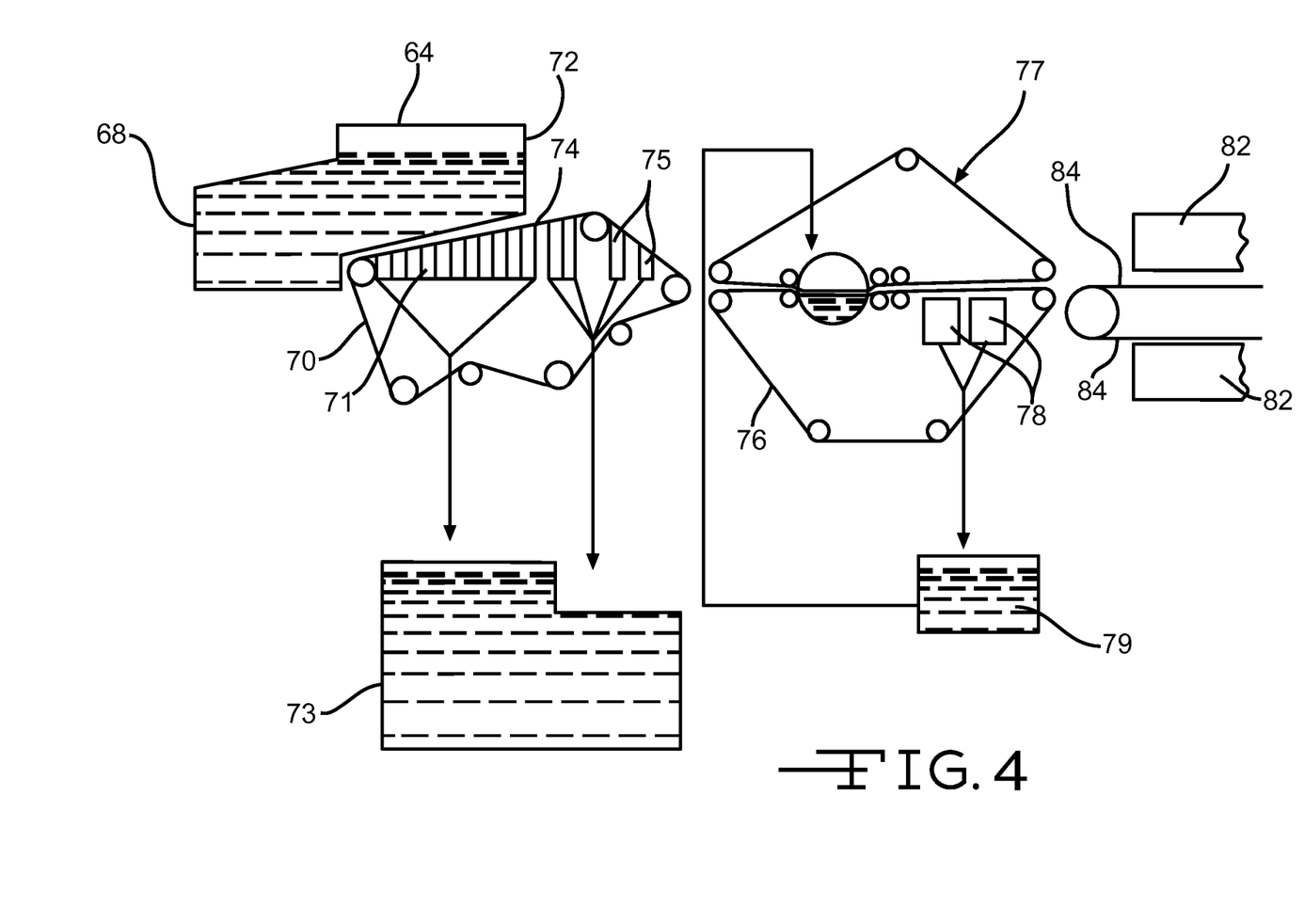
FIGS. 4 and 5 show a typical system for making a wet laid nonwoven mat according to the invention.
Figure 5:
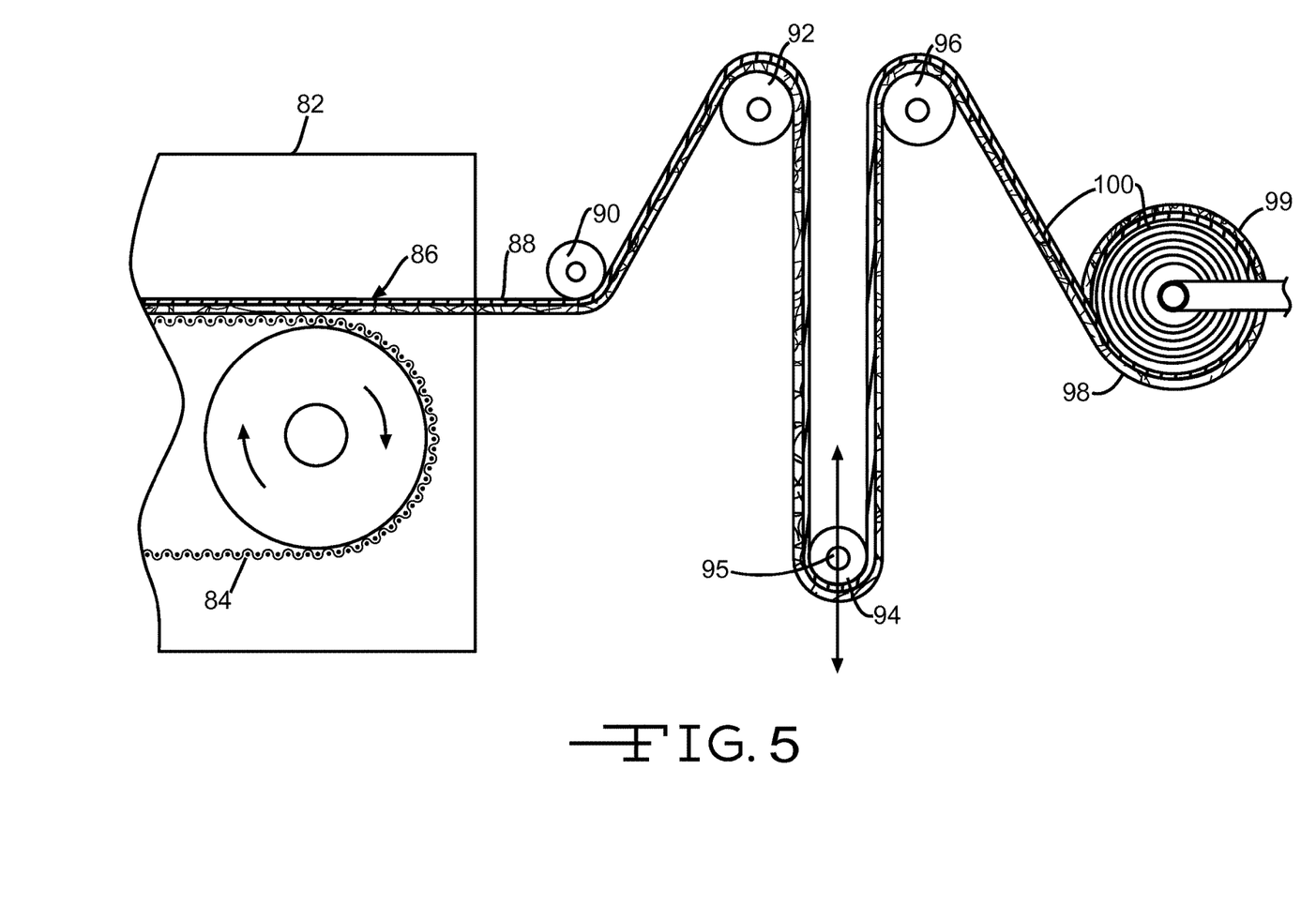

FIGS. 4 and 5 show the wet end and the down stream-finishing end of a wet mat forming system, modified according to the invention. FIG. 4 shows a typical wet mat forming system suitable for use in the methods of the invention. In this wet process shown in FIG. 3, a white water fibrous slurry of low fiber concentration is fed through pipe 68 into a headbox 69 of a wet former and forward to an inclined, moving permeable forming belt 70. The white water flows through the permeable forming belt 70 leaving a random web of fibers on the belt 70 and the thickness of the web increases as the belt 70 moves towards the downstream end 72 of the headbox 69. The whitewater coming through the permeable belt 70 flows into suction boxes or tubes 71 and on into one or more whitewater tanks 73 that supply whitewater for preparing the whitewater fibrous slurry continuously or in batches as is well known. After forming the fibrous web 74, excess whitewater still in the wet web 74 can be removed by pulling air through the wet web 74 with one or more partial vacuum boxes 75. Next, the wet web 74 is transferred to a second moving permeable belt 76 that carries the wet web 74 through an application section 77, a saturation type applicator being shown, but known spray application, curtain coaters, roller coaters, and other types of binder applicators can be used instead. The dried fibrous mats 86 can contain a binder, but not necessarily. The de-dusting agent(s), and a binder if desired, are applied by spraying or otherwise conventionally saturating the wet mat 74 followed by sucking off the excess by running over one or more partial vacuum boxes or tubes 78 located beneath the permeable carrier belt 76. The resultant wet webs are then dried and any binder, if present, is cured while being carried through an oven 82 on a permeable belt 84.

Referring to FIG. 5, dry mat 88 is pulled from the oven 82 by a powered mandrel 98, supported on arms 99 that winds cooled mat 100 into a roll for packaging and shipping. The dry mat 88 is turned upwardly, or can be turned downwardly, by a roll 90 and moved in tension towards a second turning roll 92 and through the take-up system to form a roll of the cooled mat 100. A conventional take-up roll 94 mounted on a vertical movable shaft 95 again turns the cooled fibrous mat 100 180 degrees towards a final turning roll 96. The cooled fibrous mat 100 is maintained in slight tension throughout the take-up and winding portion of the system.

The fibrous mats are made of one or more of a wide variety of fibers including natural fibers, synthetic polymer fibers, ceramic fibers glass fibers, carbon fibers and any combination thereof. The diameter of the fibers are not critical, but usually have mean or average fiber diameters of less than about 30 microns, normally less than about 23 microns, typically less than about 17 microns including less than 6 microns, and for thermal insulation and filtration mats, less than about 3 microns including submicron average or mean diameters.

Any de-dusting agent described above, or combination of two or more such agents, can be used in the invention. Normally, the de-dusting agent(s) will be liquid. Some suitable de-dusting agents include known de-dusting silicone compounds and/or oils, hydrocarbon oils, vegetable oils, and other organic fluids having the above described properties, with hydrocarbon oils and vegetable oils being possibly the most effective, especially when added in amounts of about 0.2 wt. % to about 1.2 wt. %, based on the dry weight of the fibrous mat, web or blanket prior to the addition of the de-dusting agent(s).

Any kind of binder typically used to bond fibers together into mats, webs or blankets can be used in the invention. These include, but are not limited to, urea formaldehyde, plasticized urea formaldehyde, phenol formaldehyde, melamine formaldehyde, acrylics, polyvinyl alcohol, polyvinyl acetate, SBS, polyurethanes, etc. Normally, the binder and de-dusting agent is prepared as an aqueous solution, emulsion, or suspension, but volatile solvents can be used in place of water, though this is not most typical.

The binder typically used in making insulation webs and blanket products in the processes as shown in FIGS. 1 and 2, or known variations thereof, is a formaldehyde-free polycarboxy polymer and comprises an organic polymer or oligomer containing more than one pendant carboxy group. The polycarboxy polymer may be a homopolymer or copolymer prepared from unsaturated carboxylic acids including but not necessarily limited to acrylic acid, methacrylic acid, crotonic acid, isocrotonic acid, maleic acid, cinnamic acid, 2-methylmaleic acid, itaconic acid, 2-methylitaeonic acid, alpha, beta-methyleneglutaric acid, and similar acids. Alternatively, the polycarboxy polymer may be prepared from unsaturated anhydrides including, but not limited to, maleic anhydride, methacrylic anhydride, and similar anhydrides, and mixtures thereof. Methods for polymerizing these acids and anhydrides are well known in the synthetic resin art.

The polycarboxy polymer used herein may additionally comprise a copolymer of one or more of the abovementioned unsaturated carboxylic acids or anhydrides and one or more vinyl compounds including, but not limited to, styrene, alpha-methylstyrene, acrylonitrile, methacrylonitrile, methyl acryloate, ethyl acrylate, n-butyl acrylate, isobutyl acrylate, methyl methacrylate, isobutyl methacrylate, blycidyl methacrylate, vinyl methyl ether, vinyl acetate, and similar vinyl compounds. Methods of preparing these compounds are well known in the art.

In the preferred formaldehyde-free binder useful in the invention, typical polycarboxy polymers comprise homopolymers and copolymers of polyacrylic acid. More typical are polyacrylic acid copolymers or homopolymers having a molecular weight of less than 10,000, even more typical less than about 5,000 and most typical molecular weights of less than about 3,000. The formaldehyde-free curable aqueous binder compositions typically used in the invention also contains a polyol containing at least two hydroxyl groups. The polyol must be sufficiently nonvolatile such that it will substantially remain available for reaction with the polyacid in the composition during drying and curing operations in the oven. The polyol may be a compound with a molecular weight less than about 1000 bearing at least two hydroxyl groups such as, for example, ethylene glycol, glycerol, pentaerythritol, trimethylol propane, sorbitol, sucrose, glucose, resorcinol, catechol, pyrogallol, glycollated ureas, 1,4-cylohexane diol, diethanolamine, triethanolamine, and certain reactive polyols such as, for example hydroxyalkylamides, such as for example, bis[N,N-di(beta-hydroxyethyl)]adipamide, as may be prepared according to the teachings of U.S. Pat. No. 4,076,917, the disclosure being incorporated herein by reference, or it may be an addition polymer containing at least two hydroxyl groups such as, for example, polyvinyl alcohol, partially hydrolyzed polyvinyl acetate, and homopolymer or copolymers of hydroxyethyl (meth)acrylate, hydroxypropl(meth)acrylate, or similar compounds. The most typical polyol used here is triethanolamine (TEA).

The ratio of the number of equivalents of carboxy, anhydride, or salts thereof of the polyacid to the number of equivalents of hydrolyl in the polyol is from about 1:0.01 to about 1:3. An excess of equivalents of carboxy, anhydride, or salts thereof of the polyacid to the equivalents of hydroxyl in the polyol is most typical. The most typical ratio of the number of equivalents of carboxy, anhydride, or salts thereof in the polyacid to the number of equivalents of hydroxyl in the polyol is from about 1:0.2 to about 1:1. The more typical ratio of the number of equivalents of carboxy, anhydride, or salts thereof in the polyacid to the number of equivalents of hydroxyl in the polyol is from about 1:0.4 to about 1:0.95, even more typical from 1:0.6 to 1:0.8, and most typical from 1:0.65 to 1:0.75. A low ratio, approaching 1:0.7 has been found to be of particular advantage when combined with a low molecular weight polycarboxy polymer, and also most typically with a low pH binder.

EXAMPLE

A blanket of fibrous insulation was made from glass fibers having an average fiber diameter of about 4.0 microns using the process as shown in FIG. 2 and as described above. A de-dusting agent was mixed with an aqueous binder and sprayed onto the glass fibers using a plurality of the nozzles 16 to produce a loss on ignition (LOI) in the finished blanket 29 of about 5.0 wt. percent. The de-dusting agent used was a processed soybean oil product called AgriPure Gold™ 750 (CAS-No. 68918-91-2), available from Cargill Company of Minneapolis, Minn. This product has a flash point (Cleveland Open Cup) (ASTM D-92) of approx. 324 degrees C., a viscosity index of 166 and a viscosity at 40 degrees C. of about 748 cSt (centistokes) and about 69 cSt at 100 degrees C. The specific gravity was 0.95, the acid value is about 11.9 and the hydroxyl value is about 15.5. This de-dusting agent was added in the binder in an amount to produce a final de-dusting agent content of about 0.7 wt. percent, based on the dry weight of the final blanket 29. The binder was an aqueous solution of a homopolymer and/or copolymer of polyacrylic acid modified with an unsaturated fatty acid, where the polyacrylic acid polymer had a molecular weight of less than 5000 and triethanolamine, wherein the amount of polyacrylic acid polymer and triethanolamine is such that the of carboxy group equivalents to hydrolyl group equivalents was in the range of about 1:0.65 to about 1:0.75. This binder was made in accordance with the disclosure of U.S. Pat. No. 6,884,838, incorporated herein in full by reference. The fiber glass blanket produced in this Example exhibited the same product performance in terms of dust, color, odor, and recovery as prior art product using de-dusting agents that have caused frequent oven fires and oven duct fires, but a superior "feel", compared with prior art products—a more user friendly product as described as being less abrasive and less irritating to the skin after substantial handling of the product. The product had a tactile feel, i.e. those handling having a perception of a film on the fibers something like handling sheeps' wool containing lanolin.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

The invention claimed is:

1. A method of producing a fibrous mat, web and/or blanket products comprising glass, glassy and/or inorganic fibers, the products causing less irritation and abrasion to the skin, the inorganic fibers having an average fiber diameter in the range of about 0.5 to about 23 microns, the method comprising:
    mixing a de-dusting agent, a binder, and water to form an aqueous solution consisting of the de-dusting agent, water, and binder,
    applying the aqueous solution to the fibers,
    collecting said fibers on a collection belt to form a web, mat or blanket and subsequently hot processing the web, mat or blanket to a temperature in the range of about 175 degrees C. to about 345 degrees C. to make the fibrous product,
    wherein about 0.2 to about 1.2 wt. percent of the de-dusting agent is used based on the dry weight of the finished product, wherein the de-dusting agent consists of a soybean oil that is thermally processed so as to oxidize the soybean oil to increase the molecular weight of the soybean oil such that the oil does not have to be emulsified for dispersion in the aqueous solution, the de-dusting agent having a flash point of at least 315 degrees C. and having low volitilization at the hot processing temperatures, the low volitilization defined as containing about 40 to about 60 wt. %, less volatiles when tested at 300 degrees C. (TGA test) than Brightstock 150 type petroleum oil de-dusting agent,
    the de-dusting agent having a viscosity at 40 degrees C. of about 748 cSt+/−50 cSt and about 69 cSt+/−10 cSt at 100 degrees C., a specific gravity of about 0.95, an acid value of about 12+/−4 and a hydroxyl value of about 15.5+/−5.

2. The method of claim 1 wherein the binder is also applied to the fibers in an amount in the range of about 1 to about 30 wt. percent, based on the dry weight of the final product.

3. The method of claim 1 wherein the binder is also applied to the fibers in an amount in the range of about 1 to about 30 wt. percent, based on the dry weight of the final product, and wherein the low volitilization defined as containing about 50 to about 60 wt. %, less volatiles when tested at 300 degrees C. (TGA test) than Brightstock 150 type petroleum oil de-dusting agent.

4. The method of claim 1 wherein the de-dusting agent has a flash point of about 324 degrees C.

5. The method of claim 2 wherein the de-dusting agent has a flash point of about 324 degrees C.

6. The method of claim 3 wherein the de-dusting agent has a flash point of about 324 degrees C.

7. The method of claim 1 wherein the de-dusting oil has a flash point (Cleveland Open Cup) (ASTM D-92) of approx. 324 degrees C., a viscosity index of about 166 and a viscosity at 40 degrees C. of about 748 cSt and about 69 cSt at 100 degrees C., a specific gravity of about 0.95, an acid value of about 11.9 and a hydroxyl value of about 15.5.

8. A fibrous mat, web or blanket produced by the method of claim 1.

9. The fibrous mat, web or blanket produced by the method of claim 2.

10. The fibrous mat, web or blanket produced by the method of claim 3.

11. The fibrous mat, web or blanket produced by the method of claim 5.

12. The fibrous mat, web or blanket produced by the method of claim 7.

13. The method of claim 1 wherein the de-dusting agent is added to the binder to produce a final de-dusting agent content of about 0.7 wt. percent, based on the dry weight of the fibrous mat, web and/or blanket product.

14. The method of claim 2 wherein the binder comprises an aqueous solution of a homopolymer and/ or copolymer of polyacrylic acid modified with an unsaturated fatty acid, wherein the polyacrylic acid polymer has a molecular weight of less than 5000.

15. The method of claim 14, wherein an amount of the polyacrylic acid polymer to triethanolamine is such that the of carboxy group equivalents to hydrolyl group equivalents is in the range of about 1:0.65 to about 1:0.75.

* * * * *